United States Patent Office.

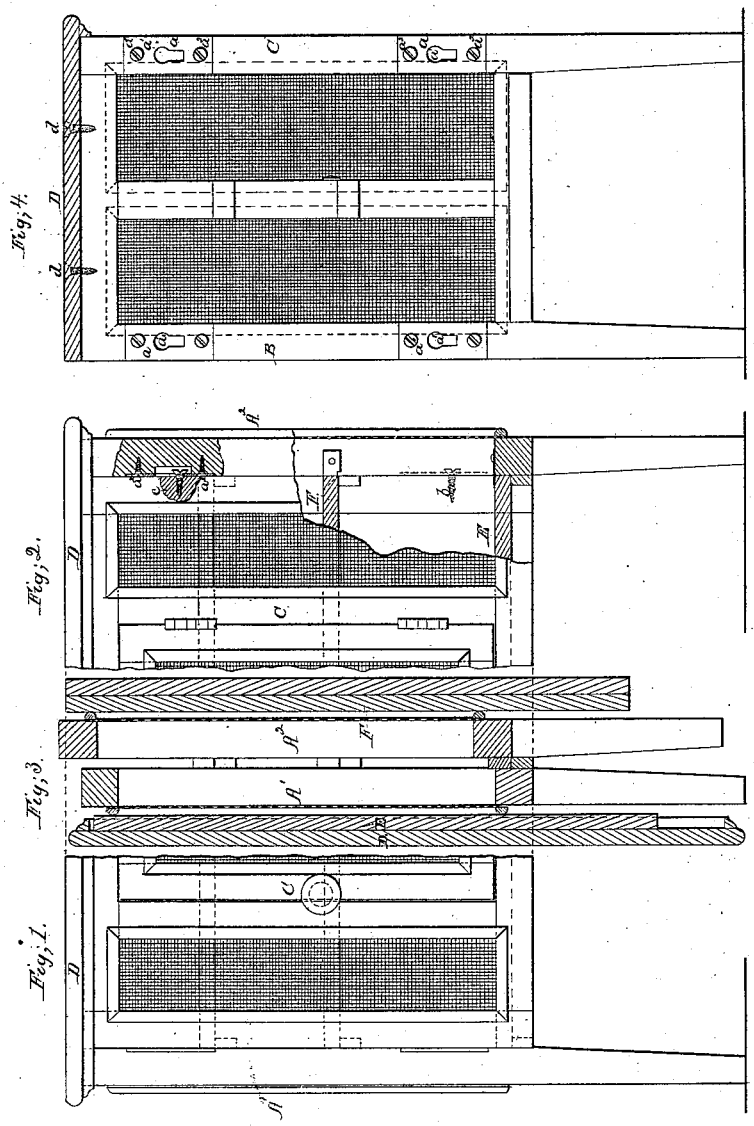

FREDERICK S. GWYER, OF NEW YORK, N. Y., ASSIGNOR TO HIMSELF AND LEVI H. MACE, OF SAME PLACE.

*Letters Patent No. 61,619, dated January 29, 1867.*

---

IMPROVED MEAT SAFE.

---

*The Schedule referred to in these Letters Patent and making part of the same.*

---

TO ALL WHOM IT MAY CONCERN:

Be it known that I, FREDERICK S. GWYER, of the city and county of New York, and State of New York, have invented certain new and useful improvements in Meat Safes; and I do hereby declare that the following is a full and exact description thereof.

My invention relates to means for cheapening the transportation and diminishing the risk of injury to the delicate wire gauze of the structure in being handled.

I will first describe what I consider the best means of carrying out my invention, and will afterwards designate the points which I believe to be new. The accompanying drawings form a part of this specification.

Figure 1 is a front elevation of nearly half of the meat safe.

Figure 2 is a front elevation partly in section of nearly half of the meat safe.

Fig. 1 shows the left and fig. 2 the right, a portion being broken away between to allow room for an edge view of some of the parts between.

Figure 3 is the said edge view, or rather vertical section. It represents a central section longitudinally through the end pieces, top, and shelves when packed for storage or transportation.

Figure 4 is a view of one of the end pieces, as seen from the inside.

Similar letters of reference indicate like parts in all of the figures.

$A^1$ $A^2$ are the ends of the meat safe. They are constructed in the usual form, so as to carry the body of the meat safe upon supports or legs, as represented. B is the back, and C is the front of the meat safe. D is the top, and is adapted to overlap all the other parts. E and F are horizontal boards, the lowermost serving as a floor for the body, and the uppermost F as a shelf for the meat safe. The structure is adapted to be readily taken apart and put together. Supposing the meat safe to be set up, and it be desired to transport it. The screws $d$ are withdrawn by the aid of an ordinary screw-driver, and the top D is taken off and laid upon the floor. By taking hold of the front part C, after the shelf F and bottom E have been removed, and lifting it to the extent of about an inch, the ends $A^1$ $A^2$ may be sprung slightly apart at their front edges disclosing the wood screws $c$, the heads of which project a short distance beyond the ends of the front C. These screws, which are by preference brass or tinned iron, are screwed in and adjusted with care, so that they correspond in position, and in the extent to which they project, with recesses formed in the adjacent sides of the corner posts which form portions of the ends $A^1$ $A^2$. These recesses are covered by plates of metal $a$ having slots indicated by $a^1$. The upper ends of these slots $a^1$ are sufficiently large to allow the heads of the screws $c$ to pass freely. The main portions of each of the slots $a^1$ are narrower, and are only of sufficient width to allow of the passage of the body of the corresponding screw $c$. It follows that when the front C is lifted, the ends $A^1$ $A^2$ of the meat safe may be easily sprung apart so as to draw out the heads of the screws $c$ through the upper ends of the slots $a^1$. Having thus removed the entire front C, I lay it aside, and proceed to perform the same operation with the back, B, lifting it and drawing the heads of its screws $b$ from the corresponding slots, in the same manner as has already been described for the front. The ends $A^1$ and $A^2$ are now entirely free, and should be laid on the floor on the upper face of the top piece D. I now apply the shelves E and F, and the entire structure, with the exception of the back and front pieces B and C, is now piled in a very small compass upon the floor. In packing the front and back pieces, I lay the back piece B upon the floor, and lay the front piece C upon it. These portions are now packed in a small compass; and if, as usual, there are considerable numbers of the safes to be shipped together, I apply the pieces B and C of the next safe upon the pieces just described, but in the reverse order; that is, I lay the front piece C of the second safe upon the front piece C of the safe just described, and then apply the back piece B of the second safe. One advantage of this construction of safe is that the freight is much less in shipping, whether by sea or land. Another is, that the fragile wire gauze, or rather cloth, the material of the ends and fronts, is very efficiently protected from any violence. It will be observed that by piling of the ends and front piece upon the cover, which latter is strong and capable of withstanding any reasonable amount of violence, and then applying upon the top the shelf and floor piece, which is also capable of withstanding violence, the delicate material in the ends $A^1$ $A^2$ is guarded on both sides. It will be also observed that my mode of piling the front pieces C of two safes together, and putting the back pieces B, which are solid, on each side of them, gives a similar protection to the delicate material in these parts. The plates $a$ are held in their places by small wood screws $a^2$, which may be of common iron: I am particular about the material of the wood screws, or screwed knobs $b\ c$, because I wish to guard against their operation being obstructed by rust. So long as they can be turned without particular difficulty, the extent to which the heads of each of these screws project may be graduated with great nicety by turning the screws a little in or out as required, to allow for any warping, swelling, or change in any manner of the parts, as also to allow for any wear to which the surfaces of these parts, and also of the plates $a$, may be subjected.

The reconstructing of the meat safe from the packed pieces is the reverse of that just described. Unpacking and liberating all of the several parts, the ends $A^1\ A^2$ are held up by an assistant, while the back piece B is held in position, and the end pieces are then applied so as to receive the knob $b$ into the slots $a^1$, and the back piece B is then pressed down firmly until its top is flush or even with the tops of the end pieces $A^1\ A^2$. The end pieces being then sprung open slightly, the front piece C is held in position, and its knobs, or the heads of the screws $c$, are received in the same manner into the slots $a^1$. The front piece C is then pressed down until its top is flush. The floor E and shelf F being then introduced, the top piece D is then applied in position, and the screws $d$ are inserted. When these are screwed down tight, the entire structure is firm and rigid.

I have represented the door in the front C as usual. It can, if preferred, be made double, or can be made in either or both of the end pieces. So, also, the back piece B can, if preferred, be fitted with wire cloth; but that is usually unnecessary, and the safety of the parts in transportation would be less secured by such a construction. I have tried hook-headed screws instead of round-headed screws for the projecting parts $b\ c$. Many such slight modifications of the fastenings of the other parts may be employed without varying from the principle of my invention. When the top is made, as it frequently is, with a hanging lip or cleat, or the like, at the front and ends, I can fill the space between in packing the pieces by laying one of the shelves there before proceeding to fill the ends thereon. It will be obvious that a double safe, by which I mean a deeper safe, extending nearly or quite down to the bottom of the legs, may easily be made in the same manner as above described. The bottom pieces for the front and back may, in such cases, be made to fasten separately to the legs, or they may be made in one with the pieces which compose the upper safe. Although I have spoken above of only two shelves, one besides the bottom, it is evident that more can be employed if desired. The drawings represent one more, which is of less width than the full shelf; but this additional shelf can be full width if preferred, and there may be any greater number desired. It is not important that the ends be sprung apart, as above described, in order to apply the parts together properly. The matter may be accomplished without taxing the elasticity of the parts, by applying the back and front end to one end $A$ first, and then applying the other end A to both the back and front and sliding it upward.

Having now fully described my invention, what I claim as new, and desire to secure by Letters Patent, is as follows:

I claim the separable meat safe with detachable parts fitted with fastenings, substantially as herein specified, and adapted to be packed and transported in a small compass, and with protection to the delicate portions of its structure as herein set forth.

FREDERICK S. GWYER.

Witnesses:
D. L. FREEBORN,
W. C. DEY.